US012603286B2

(12) United States Patent
Matsuo et al.

(10) Patent No.: US 12,603,286 B2
(45) Date of Patent: Apr. 14, 2026

(54) CONDUCTIVE MATERIAL PASTE FOR ALL-SOLID-STATE SECONDARY BATTERY ELECTRODE

(71) Applicant: ZEON CORPORATION, Tokyo (JP)

(72) Inventors: Yusaku Matsuo, Tokyo (JP); Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 635 days.

(21) Appl. No.: 17/413,952

(22) PCT Filed: Dec. 5, 2019

(86) PCT No.: PCT/JP2019/047715
§ 371 (c)(1),
(2) Date: Jun. 15, 2021

(87) PCT Pub. No.: WO2020/137435
PCT Pub. Date: Jul. 2, 2020

(65) Prior Publication Data
US 2022/0045329 A1      Feb. 10, 2022

(30) Foreign Application Priority Data

Dec. 28, 2018      (JP) ................................. 2018-248087

(51) Int. Cl.
| | |
|---|---|
| *H01M 4/62* | (2006.01) |
| *H01M 4/133* | (2010.01) |
| *H01M 4/139* | (2010.01) |
| *H01M 4/505* | (2010.01) |
| *H01M 4/525* | (2010.01) |
| *H01M 10/0562* | (2010.01) |
| *H01M 10/0565* | (2010.01) |
| *H01M 4/02* | (2006.01) |

(52) U.S. Cl.
CPC ........... *H01M 4/622* (2013.01); *H01M 4/133* (2013.01); *H01M 4/139* (2013.01); *H01M 4/505* (2013.01); *H01M 4/525* (2013.01); *H01M 4/625* (2013.01); *H01M 10/0562* (2013.01); *H01M 10/0565* (2013.01); *H01M 2004/027* (2013.01); *H01M 2004/028* (2013.01); *H01M 2300/0068* (2013.01); *H01M 2300/0082* (2013.01)

(58) Field of Classification Search
CPC ...... H01M 4/622; H01M 4/133; H01M 4/139; H01M 4/505; H01M 4/525; H01M 4/625; H01M 10/0562; H01M 10/0565; H01M 2004/027; H01M 2004/028; H01M 2300/0068; H01M 2300/0082
USPC ....................................................... 429/217
See application file for complete search history.

(56) References Cited

U.S. PATENT DOCUMENTS

| | | | | |
|---|---|---|---|---|
| 2013/0040206 A1* | 2/2013 | Yoshida | ............ | H01M 10/0562 |
| | | | | 427/58 |
| 2013/0177806 A1* | 7/2013 | Caldwell | ............... | H01M 4/525 |
| | | | | 252/521.5 |
| 2014/0127579 A1* | 5/2014 | Yoshida | ................ | H01M 4/621 |
| | | | | 429/306 |
| 2015/0086875 A1 | 3/2015 | Yoshida | | |
| 2015/0357648 A1* | 12/2015 | Sugimoto | ............. | H01M 4/622 |
| | | | | 429/217 |
| 2017/0214051 A1* | 7/2017 | Yoon | ................. | H01M 10/0525 |
| 2017/0244097 A1* | 8/2017 | Ose | ........................ | H01M 4/136 |
| 2018/0248191 A1* | 8/2018 | Liu | ........................ | C08F 292/00 |
| 2019/0214673 A1 | 7/2019 | Maeda | | |

FOREIGN PATENT DOCUMENTS

| | | | |
|---|---|---|---|
| CN | 105814718 A | | 7/2016 |
| EP | 2908364 B1 | | 4/2018 |
| EP | 3696886 A1 | | 8/2020 |
| EP | 3846264 A1 | | 7/2021 |
| JP | 2011070908 A | | 4/2011 |
| JP | 2012048892 A | * | 3/2012 |
| JP | 2012243476 A | | 12/2012 |
| JP | 2015229716 A | | 12/2015 |
| JP | 2016207542 A | | 12/2016 |
| JP | 2017147158 A | | 8/2017 |
| KR | 1020170050234 A | | 5/2017 |
| WO | 2013133394 A1 | | 9/2013 |
| WO | 2013146916 A1 | | 10/2013 |
| WO | 2014057993 A1 | | 4/2014 |

(Continued)

OTHER PUBLICATIONS

Aug. 24, 2022, the Extended European Search Report issued by the European Patent Office in the corresponding European Patent Application No. 19902277.3.
Charles M. Hansen, Hansen Solubility Parameters: A User's Handbook, Second Edition, 2007, CRC Press, Boca Raton FL.
Jan. 21, 2020, International Search Report issued in the International Patent Application No. PCT/JP2019/047715.
Jun. 16, 2021, International Preliminary Report on Patentability issued in the International Patent Application No. PCT/JP2019/047715.

(Continued)

*Primary Examiner* — Allison Bourke
*Assistant Examiner* — Robert Gene West
(74) *Attorney, Agent, or Firm* — KENJA IP LAW PC

(57) ABSTRACT

Provided is a conductive material paste for an all-solid-state secondary battery electrode that can bring about sufficiently reduced internal resistance and excellent high-temperature cycle characteristics in an all-solid-state secondary battery. The conductive material paste for an all-solid-state secondary battery electrode contains a conductive material, a polymer including a (meth)acrylic acid ester monomer unit in a proportion of not less than 25 mass % and not more than 95 mass %, and an organic solvent having a solubility parameter (SP value) of not less than 6.4 $(cal/cm^3)^{1/2}$ and not more than 10.0 $(cal/cm^3)^{1/2}$.

8 Claims, No Drawings

(56)         References Cited

FOREIGN PATENT DOCUMENTS

WO          2017213156  A1    12/2017

OTHER PUBLICATIONS

Nov. 21, 2025, Communication pursuant to Article 94(3) EPC issued by the European Patent Office in the corresponding European Patent Application No. 19902277.3.

* cited by examiner

CONDUCTIVE MATERIAL PASTE FOR ALL-SOLID-STATE SECONDARY BATTERY ELECTRODE

TECHNICAL FIELD

The present disclosure relates to a conductive material paste for an all-solid-state secondary battery electrode, a slurry composition for an all-solid-state secondary battery electrode, an electrode for an all-solid-state secondary battery, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

For this reason, all-solid-state secondary batteries in which a solid electrolyte is used instead of an organic solvent electrolyte having high flammability and high danger of ignition upon leakage are attracting attention as secondary batteries having high safety.

An all-solid-state secondary battery is a secondary battery that includes a solid electrolyte layer between a positive electrode and a negative electrode. The electrodes (positive electrode and negative electrode) can each be formed by applying a slurry composition containing an electrode active material (positive electrode active material or negative electrode active material), a binder, a solid electrolyte, and so forth onto a current collector and then drying the slurry composition to provide an electrode mixed material layer (positive electrode mixed material layer or negative electrode mixed material layer) on the current collector, and the solid electrolyte layer can be formed by applying a slurry composition containing a binder, a solid electrolyte, and so forth onto an electrode or a releasable substrate and then drying the slurry composition. The all-solid-state secondary battery is then produced by stacking the positive electrode and the negative electrode such that the positive electrode mixed material layer of the positive electrode and the negative electrode mixed material layer of the negative electrode are in opposition via the solid electrolyte layer, and generally performing press processing thereof.

In recent years, various studies have been made in relation to the process described above with the aim of improving the performance of all-solid-state secondary batteries. Patent Literature (PTL) 1 proposes that a production process of a positive electrode mixed material slurry is split into a first step of mixing a conductive material and a sulfide inorganic solid electrolyte to obtain a mixture and a second step of mixing at least a positive electrode active material, an inorganic solid electrolyte, and the mixture, and that greater energy is imparted in the first step in order to reduce battery resistance at low battery capacity.

CITATION LIST

Patent Literature

PTL 1: JP2017-147158A

SUMMARY

Technical Problem

PTL 1 relates to a technique that focuses on reducing battery resistance at low battery capacity. Improvement of cycle characteristics is also a significant issue for all-solid-state secondary batteries, and there is demand for improving cycle characteristics in a high-temperature region (high-temperature cycle characteristics), in particular, in order to enable the use of all-solid-state secondary batteries in a wider variety of applications.

An object of the present disclosure is to provide a conductive material paste for an all-solid-state secondary battery electrode that can yield an all-solid-state secondary battery having sufficiently reduced internal resistance and excellent high-temperature cycle characteristics.

Solution to Problem

The inventors discovered that by producing a slurry composition for an all-solid-state secondary battery electrode using a paste in which a conductive material, a specific binder, and a specific organic solvent have been compounded in advance and by using this slurry composition to produce an electrode for an all-solid-state secondary battery, it is possible to achieve sufficiently reduced internal resistance and excellent high-temperature cycle characteristics in an all-solid-state secondary battery including the electrode. In this manner, the inventors completed the present disclosure.

Specifically, the present disclosure relates to a conductive material paste for an all-solid-state secondary battery electrode comprising: a conductive material; a polymer including a (meth)acrylic acid ester monomer unit in a proportion of not less than 25 mass % and not more than 95 mass %; and an organic solvent having a solubility parameter (SP value) of not less than 6.4 $(cal/cm^3)^{1/2}$ and not more than 10.0 $(cal/cm^3)^{1/2}$.

The term "conductive material paste for an all-solid-state secondary battery electrode" as used in the present specification refers to a composition that is a material used in production of a slurry composition for an all-solid-state secondary battery electrode and that contains a conductive material, a binder, and an organic solvent.

In the present specification, "(meth)acryl" is used to indicate "acryl and/or methacryl".

Moreover, the term "monomer unit" as used in the present specification means a "structural unit derived from that monomer". Furthermore, the phrase "includes a monomer unit" means that "a structural unit derived from that monomer is included in a polymer obtained using the monomer", and the proportional content of a monomer unit is expressed by the proportion constituted by that monomer unit when the overall polymer is taken to be 100 mass %.

Also, the "solubility parameter (SP value)" referred to in the present specification is the Hansen solubility parameter ($\delta$) (units: $(cal/cm^3)^{1/2}$) and is expressed by a relationship: $\delta^2 = \delta d^2 + \delta p^2 + \delta h^2$. In the preceding relationship, "$\delta d$" is a "term for the contribution of dispersion force between molecules", "$\delta p$" is a "term for the contribution of polar interactions between molecules", and "$\delta h$" is a "term for the contribution of hydrogen bonding between molecules", and these are physical property values dependent on the type of material (refer to Charles M. Hansen, "Hansen Solubility Parameters: A User's Handbook, Second Edition", CRC Press, Boca Raton FL, (2007) (hereinafter, also referred to simply as "the handbook")). In the case of an organic solvent that is not described in the handbook or the like, it is possible to use a predicted value that is calculated using the computer software "Hansen Solubility Parameters in Practice (HSPiP)".

Although the mechanism by which the presently disclosed conductive material paste for an all-solid-state secondary battery electrode brings about sufficiently reduced internal resistance and excellent high-temperature cycle characteristics in an all-solid-state secondary battery is unclear, the mechanism can be presumed to be as follows.

The presently disclosed conductive material paste for an all-solid-state secondary battery electrode has excellent dispersibility of the conductive material. Consequently, the use of this conductive material paste in a slurry composition for an all-solid-state secondary battery electrode provides a good dispersion state of the conductive material in the slurry composition and also imparts excellent dispersibility to a solid electrolyte and an electrode active material in the slurry composition. Moreover, in an electrode mixed material layer that is formed using this slurry composition, uneven distribution or the like of the conductive material is inhibited, and sufficient electrical contact among the electrode active material is ensured. Furthermore, by using an electrode that includes this electrode mixed material layer in an all-solid-state secondary battery, sufficiently reduced internal resistance and excellent high-temperature cycle characteristics can be achieved in the all-solid-state secondary battery.

In the presently disclosed conductive material paste for an all-solid-state secondary battery electrode, it is preferable that a polymer further including an α,β-unsaturated nitrile monomer unit is used. By using a polymer that further includes an α,β-unsaturated nitrile monomer unit as a binder, it is possible to obtain even better dispersibility of the conductive material in the conductive material paste and to effectively bring about sufficiently reduced internal resistance in an all-solid-state secondary battery. It is more preferable that a polymer including an α,β-unsaturated nitrile monomer unit in a proportion of not less than 2 mass % and not more than 30 mass % is used in the presently disclosed conductive material paste for an all-solid-state secondary battery electrode.

In the presently disclosed conductive material paste for an all-solid-state secondary battery electrode, it is preferable that a polymer further including a hydrophobic monomer unit is used. The term "hydrophobic monomer unit" as used in the present specification means a "monomer unit for which the monomer itself has a solubility (25° C.) of 1 g/l L or less in water and that is a monomer unit other than the (meth)acrylic acid ester monomer unit and the α,β-unsaturated nitrile monomer unit". By using a polymer that further includes a hydrophobic monomer unit as a binder, it is possible to obtain even better dispersibility of the conductive material in the conductive material paste and to effectively bring about sufficiently reduced internal resistance in an all-solid-state secondary battery. It is more preferable that a polymer including a hydrophobic monomer unit in a proportion of not less than 3 mass % and not more than 60 mass % is used in the presently disclosed conductive material paste for an all-solid-state secondary battery electrode.

The present disclosure also relates to a slurry composition for an all-solid-state secondary battery electrode comprising: any one of the conductive material pastes set forth above; an electrode active material; and a solid electrolyte. The presently disclosed slurry composition for an all-solid-state secondary battery electrode can bring about sufficiently reduced internal resistance and excellent high-temperature cycle characteristics in an all-solid-state secondary battery.

The present disclosure also relates to an electrode for an all-solid-state secondary battery comprising an electrode mixed material layer formed using any one of the slurry compositions for an all-solid-state secondary battery electrode set forth above. The presently disclosed electrode for an all-solid-state secondary battery can bring about sufficiently reduced internal resistance and excellent high-temperature cycle characteristics in an all-solid-state secondary battery.

The present disclosure also relates to an all-solid-state secondary battery comprising the electrode set forth above. The presently disclosed all-solid-state secondary battery has sufficiently reduced internal resistance and excellent high-temperature cycle characteristics.

Advantageous Effect

According to the present disclosure, a conductive material paste for an all-solid-state secondary battery electrode that can bring about sufficiently reduced internal resistance and excellent high-temperature cycle characteristics in an all-solid-state secondary battery is provided.

Moreover, according to the present disclosure, a slurry composition for an all-solid-state secondary battery electrode and an electrode for an all-solid-state secondary battery that can bring about sufficiently reduced internal resistance and excellent high-temperature cycle characteristics in an all-solid-state secondary battery are provided.

The presently disclosed all-solid-state secondary battery has sufficiently reduced internal resistance and excellent high-temperature cycle characteristics, and is highly useful in industry.

DETAILED DESCRIPTION

The following provides a detailed description of embodiments of the present disclosure.

The presently disclosed conductive material paste for an all-solid-state secondary battery electrode is used as a material in production of a slurry composition for an all-solid-state secondary battery electrode.

The presently disclosed slurry composition for an all-solid-state secondary battery electrode is used in formation of an electrode mixed material layer (positive electrode mixed material layer or negative electrode mixed material layer) of an all-solid-state secondary battery. The presently disclosed electrode (positive electrode or negative electrode) for an all-solid-state secondary battery includes the aforementioned electrode mixed material layer (positive electrode mixed material layer or negative electrode mixed material layer) and is used in production of an all-solid-state secondary battery.

The presently disclosed all-solid-state secondary battery is a secondary battery in which either or both of a positive electrode and a negative electrode are the presently disclosed electrode (positive electrode or negative electrode) for an all-solid-state secondary battery.

(Conductive Material Paste for all-Solid-State Secondary Battery Electrode)

The presently disclosed conductive material paste for an all-solid-state secondary battery electrode (hereinafter, also referred to as a "conductive material paste") contains a conductive material, a polymer including a (meth)acrylic acid ester monomer unit in a proportion of not less than 25 mass % and not more than 95 mass % (hereinafter, also referred to as a "(meth)acrylic polymer"), and an organic solvent having a solubility parameter (SP value) of not less than 6.4 $(cal/cm^3)^{1/2}$ and not more than 10.0 $(cal/cm^3)^{1/2}$. The conductive material paste does not normally contain a solid electrolyte or an electrode active material.

<Conductive Material>

The presently disclosed conductive material paste contains a conductive material. The conductive material is a component for ensuring electrical contact among an electrode active material in an electrode mixed material layer of an all-solid-state secondary battery. Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals. Of these conductive materials, acetylene black, Ketjenblack, and furnace black are preferable. One conductive material may be used, or two or more conductive materials may be used in combination in a freely selected ratio.

<(Meth)Acrylic Polymer>

The presently disclosed conductive material paste contains a polymer including a (meth)acrylic acid ester monomer unit in a proportion of not less than 25 mass % and not more than 95 mass %.

In the present disclosure, the polymer ((meth)acrylic polymer) that includes a (meth)acrylic acid ester monomer unit in a proportion of not less than 25 mass % and not more than 95 mass % is a binder component. The binder component is a component for binding components contained in an electrode mixed material layer, such as an electrode active material, and holding these components so that they do not become detached from the mixed material layer. One (meth) acrylic acid ester polymer may be used, or two or more (meth)acrylic acid ester polymers may be used in combination in a freely selected ratio.

The (meth)acrylic acid ester monomer in the (meth) acrylic acid ester monomer unit may, for example, be an acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, or 2-ethylhexyl acrylate; an acrylic acid alkoxy ester such as 2-methoxyethyl acrylate or 2-ethoxyethyl acrylate; a 2-(perfluoroalkyl)ethyl acrylate such as 2-(perfluorobutyl)ethyl acrylate or 2-(perfluoropentyl)ethyl acrylate; a methacrylic acid alkyl ester such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, or 2-ethylhexyl methacrylate; a methacrylic acid alkoxy ester such as 2-methoxyethyl methacrylate or 2-ethoxyethyl methacrylate; a 2-(perfluoroalkyl) ethyl methacrylate such as 2-(perfluorobutyl)ethyl methacrylate or 2-(perfluoropentyl)ethyl methacrylate; benzyl acrylate; benzyl methacrylate; or the like. The term "(meth) acrylic acid ester monomer" is also inclusive of diesters of α,β-ethylenically unsaturated dicarboxylic acids, examples of which include lower alkyl diesters of itaconic acid such as diethyl itaconate and dibutyl itaconate. Of these (meth) acrylic acid ester monomers, methyl acrylate, ethyl acrylate, methyl methacrylate, 2-ethylhexyl acrylate, n-butyl acrylate, t-butyl acrylate, and dibutyl itaconate are preferable, and ethyl acrylate, n-butyl acrylate, and t-butyl acrylate are more preferable. One of these (meth)acrylic acid ester monomers may be used, or two or more of these (meth)acrylic acid ester monomers may be used in combination in a freely selected ratio.

The proportional content of the (meth)acrylic acid ester monomer unit in the (meth)acrylic polymer is 25 mass % or more, preferably 30 mass % or more, and more preferably 35 mass % or more, and is 95 mass % or less, preferably 90 mass % or less, and more preferably 85 mass % or less. When the proportional content of the (meth)acrylic acid ester monomer unit is not less than any of the lower limits set forth above, it is possible to impart excellent dispersibility to a solid electrolyte and the like in a slurry composition in which the conductive material paste is used and to sufficiently improve high-temperature cycle characteristics. Moreover, when the proportional content of the (meth) acrylic acid ester monomer unit is not more than any of the upper limits set forth above, dispersibility of the conductive material in the conductive material paste is sufficient, and internal resistance can be sufficiently reduced.

In the present disclosure, it is important that the (meth) acrylic polymer includes the (meth)acrylic acid ester monomer unit in a proportion of not less than 25 mass % and not more than 95 mass %. So long as this is satisfied, the types and proportional contents of monomer units other than the (meth)acrylic acid ester monomer unit can be freely selected.

The (meth)acrylic polymer preferably includes an α,β-unsaturated nitrile monomer unit. The α,β-unsaturated nitrile monomer may be acrylonitrile, methacrylonitrile, α-chloroacrylonitrile, α-ethylacrylonitrile, or the like. Of these α,β-unsaturated nitrile monomers, acrylonitrile and methacrylonitrile are preferable, and acrylonitrile is more preferable. One α,β-unsaturated nitrile monomer may be used, or two or more α,β-unsaturated nitrile monomer units may be used in combination in a freely selected ratio.

The proportional content of the α,β-unsaturated nitrile monomer unit is preferably 2 mass % or more, more preferably 3 mass % or more, and particularly preferably 4 mass % or more, and is preferably 30 mass % or less, more preferably 28 mass % or less, and even more preferably 26 mass % or less. When the proportional content of the α,β-unsaturated nitrile monomer unit is not less than any of the lower limits set forth above, dispersibility of the conductive material in the conductive material paste can be further improved, and internal resistance can be effectively reduced. When the proportional content of the α,β-unsaturated nitrile monomer unit is not more than any of the upper limits set forth above, the polymer dissolves readily in an organic solvent, and this is advantageous for improving cycle characteristics.

The (meth)acrylic polymer can further include a hydrophobic monomer unit. The hydrophobic monomer unit may be an aromatic vinyl monomer unit, a conjugated diene monomer unit, an olefin monomer unit, or the like. The term "hydrophobic monomer unit" is considered to not be inclusive of a (meth)acrylic acid ester monomer unit or an α,β-unsaturated nitrile monomer unit. One type of hydrophobic monomer unit may be included, or two or more types of hydrophobic monomer units may be included in combination in a freely selected ratio.

The aromatic vinyl monomer may be an aromatic vinyl monomer such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, or divinylbenzene. Of these aromatic vinyl monomers, styrene and vinylnaphthalene are preferable.

The conjugated diene monomer may be a conjugated diene compound having a carbon number of 4 or more such as 1,3-butadiene, isoprene, 2,3-dimethyl-1,3-butadiene, or 1,3-pentadiene. Of these conjugated diene monomers, 1,3-butadiene and isoprene are preferable.

The olefin monomer may be a 1-olefin monomer, examples of which include ethylene, propylene, and 1-butene, with ethylene being preferable. The olefin monomer unit may be a structural unit obtained through hydrogenation of a conjugated diene monomer unit (i.e., may be a hydrogenated conjugated diene unit). Of such structural units, a hydrogenated 1,3-butadiene unit and a hydrogenated isoprene unit, which are structural units obtained through hydrogenation of a 1,3-butadiene monomer unit and an isoprene monomer unit, respectively, are preferable.

From a viewpoint of dispersibility of the conductive material in the conductive material paste and reduction of internal resistance, the proportional content of the hydrophobic monomer unit is preferably 3 mass % or more, more preferably 10 mass % or more, even more preferably 12 mass % or more, and particularly preferably 14 mass % or more, and is preferably 60 mass % or less, more preferably 55 mass % or less, even more preferably 50 mass % or less, and particularly preferably 45 mass % or less.

The (meth)acrylic polymer may include other monomer units besides the various monomer units described above. Examples of other monomer include unsaturated carboxylic acid monomers such as acrylic acid, methacrylic acid, itaconic acid, and fumaric acid; amide monomers such as acrylamide, N-methylolacrylamide, and acrylamido-2-methylpropane sulfonic acid; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; heterocycle-containing vinyl monomers such as N-vinylpyrrolidone, vinylpyridine, and vinylimidazole; and glycidyl group-containing monomers such as glycidyl acrylate, glycidyl methacrylate, and allyl glycidyl ether. One of these types of other monomer units may be included, or two or more of these types of other monomer units may be included in combination in a freely selected ratio.

A polyfunctional monomer including at least two groups displaying polymerization reactivity is preferably included in a proportion of 1 mass % or less, and is particularly preferably not substantially included because such a polyfunctional monomer increases the gel content of the polymer.

The (meth)acrylic polymer can be composed of not less than 25 mass % and not more than 95 mass % of the (meth)acrylic acid ester monomer unit and by at least one selected from the α,β-unsaturated nitrile monomer unit, the hydrophobic monomer unit, and the other monomer units. Preferable amounts and types of the α,β-unsaturated nitrile monomer unit, the hydrophobic monomer unit, and the other monomer units are as described above.

The weight-average molecular weight of the (meth) acrylic polymer is preferably 50,000 or more, and more preferably 100,000 or more from a viewpoint of slurry preservation stability, and is preferably 5,000,000 or less, and more preferably 2,000,000 or less from a viewpoint of slurry dispersibility.

The "weight-average molecular weight" referred to in the present specification can be measured by a method described in the EXAMPLES section of the present specification.

The gel content of the (meth)acrylic polymer is preferably 50 mass % or less, more preferably 10 mass % or less, and particularly preferably 0%. When the gel content is not more than any of the upper limits set forth above, excellent dispersibility can be imparted to an electrode active material and a solid electrolyte in a slurry composition in which the conductive material paste is used. The gel content can be controlled through the types and amounts of monomers in the polymer, the type and amount of a chain transfer agent used in polymerization, the polymerization temperature, and so forth.

The "gel content" referred to in the present specification is a value measured by a method described in the EXAMPLES section of the present specification.

No specific limitations are placed on the production method of the (meth)acrylic polymer, and the (meth)acrylic polymer can be obtained by polymerizing a monomer composition that contains the monomers described above. The proportional content of each monomer in the monomer composition can be set based on the proportional content of each type of monomer unit in the polymer.

The method of polymerization is not specifically limited and may be solution polymerization, suspension polymerization, bulk polymerization, emulsion polymerization, or the like. Emulsifiers, polymerization initiators, and the like can be used in each of these polymerization methods as necessary. The olefin monomer unit can be introduced through hydrogenation of a conjugated diene monomer unit. A commonly known method can be adopted as the method of hydrogenation without any specific limitations.

<Organic Solvent>

The presently disclosed conductive material paste contains an organic solvent having a solubility parameter (SP value) of not less than 6.4 $(cal/cm^3)^{1/2}$ and not more than 10.0 $(cal/cm^3)^{1/2}$.

The solubility parameter (SP value) of the organic solvent is preferably 6.5 $(cal/cm^3)^{1/2}$ or more, more preferably 7.5 $(cal/cm^3)^{1/2}$ or more, and even more preferably 8.0 $(cal/cm^3)^{1/2}$ or more, and is preferably 9.8 $(cal/cm^3)^{1/2}$ or less, more preferably 9.5 $(cal/cm^3)^{1/2}$ or less, and even more preferably 9.0 $(cal/cm^3)^{1/2}$ or less.

Examples of organic solvents that can be used include toluene (8.9), xylene (8.5), cyclopentyl methyl ether (CPME) (8.4), butyl butyrate (8.1), dibutyl ether (7.4), hexane (7.3), and decane (6.5). Note that the value in parentheses is the solubility parameter (SP value) (units: $(cal/cm^3)^{1/2}$). Of these organic solvents, xylene and butyl butyrate are preferable from a viewpoint of affinity with a solid electrolyte. One organic solvent may be used, or two or more organic solvents may be used in combination in a freely selected ratio.

<Other Components>

The presently disclosed conductive material paste can contain components such as leveling agents, reinforcing materials, defoamers, antioxidants, surfactants, and dispersants other than the components described above. Commonly known components can be used as these components. A binder component other than the (meth)acrylic polymer may be contained so long as the disclosed effects are not lost. Examples of such other binder components include a polymer that includes a monomer unit selected from a vinylidene fluoride (VDF) monomer unit and a hexafluoropropylene (HFP) monomer unit (for example, polyvinylidene fluoride (PVDF), poly(hexafluoropropylene) (PHFP), etc.), a styrene-butadiene copolymer (SBR), an acrylonitrile-butadiene copolymer (NBR), and hydrogenated NBR. Moreover, a solvent other than the organic solvent having a solubility parameter (SP value) of not less than 6.4 $(cal/cm^3)^{1/2}$ and not more than 10.0 $(cal/cm^3)^{1/2}$ can be contained so long as the disclosed effects are not lost.

<Make-Up and Viscosity of Conductive Material Paste>

The solid content concentration of the conductive material paste is preferably 5 mass % or more, and more preferably 7 mass % or more, and is preferably 20 mass % or less, and more preferably 15 mass % or less.

The amount constituted by the conductive material among 100 parts by mass of solid content in the conductive material paste can be set as more than 10 parts by mass, and can be set as 95 parts by mass or less.

The viscosity (Brookfield B-type viscometer, 60 rpm, 25° C.) of the presently disclosed conductive material paste is preferably less than 5,000 mPa·s, and more preferably less than 3,000 mPa·s. The viscosity is preferably 500 mPa·s or more, and more preferably 1,000 mPa·s or more from a viewpoint of stability over time.

<Production Method of Conductive Material Paste>

The production method of the presently disclosed conductive material paste is not specifically limited and may be a method in which the conductive material, (meth)acrylic polymer, and optional other components described above are mixed in the organic solvent.

In a case in which the (meth)acrylic polymer is obtained as an aqueous dispersion, the conductive material paste can be obtained by performing solvent exchange of the solvent of the aqueous dispersion with the organic solvent, and mixing the conductive material and other components before or after this solvent exchange. The method of solvent exchange is not specifically limited and may be a method in which the aqueous dispersion and the organic solvent are loaded into a rotary evaporator, the pressure is reduced, and solvent exchange and dehydration operations are performed at a specific temperature. It is preferable that the conductive material is mixed after the (meth)acrylic polymer has been substituted into the organic solvent. The organic solvent may be further added after solvent exchange or after conductive material mixing in order to adjust the concentration of the conductive material paste.

(Slurry Composition for All-Solid-State Secondary Battery Electrode)

The presently disclosed slurry composition for an all-solid-state secondary battery electrode (hereinafter, also referred to as a "slurry composition") contains the presently disclosed conductive material paste for an all-solid-state secondary battery electrode, a solid electrolyte, and an electrode active material.

<Solid Electrolyte>

The solid electrolyte may be an inorganic solid electrolyte or a polymeric inorganic solid electrolyte without any specific limitations so long as it displays conductivity with respect to charge carriers such as lithium ions. One solid electrolyte may be used, or two or more solid electrolytes may be used in combination in a freely selected ratio.

Moreover, a mixture of an inorganic solid electrolyte and a polymeric inorganic solid electrolyte may be used.

<<Inorganic Solid Electrolyte>>

The inorganic solid electrolyte may be a crystalline inorganic ion conductor or an amorphous inorganic ion conductor without any specific limitations. In a case in which the all-solid-state secondary battery is an all-solid-state lithium ion secondary battery, for example, the inorganic solid electrolyte is preferably a crystalline inorganic lithium ion conductor or an amorphous inorganic lithium ion conductor.

Although the following describes, as one example, a case in which the all-solid-state secondary battery is an all-solid-state lithium ion secondary battery, the present disclosure is not limited to this case.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_2La_3Zr_2O_{10}$, LIPON ($Li_{3+y}PO_{4-x}N_x$), and Thio-LISICON ($Li_{3.75}Ge_{0.25}P_{0.75}S_4$). Examples of amorphous inorganic lithium ion conductors include glass Li—Si—S—O and Li—P—S.

Of these examples, amorphous inorganic lithium ion conductors are preferable from a viewpoint of electrical conductivity of the inorganic solid electrolyte, and an amorphous sulfide containing Li and P is more preferable from a viewpoint of having high lithium ion conductivity and enabling reduction of internal resistance.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Sulfide glass-ceramic obtained by reacting such a mixed raw material by a mechanochemical method can also suitably be used. The molar ratio of $Li_2S:P_2S_5$ in the mixed raw material is preferably 68:32 to 80:20 from a viewpoint of maintaining a state of high lithium ion conductivity.

The lithium ion conductivity of the inorganic solid electrolyte is not specifically limited but is preferably $1 \times 10^{-4}$ S/cm or more, and more preferably $1 \times 10^{-3}$ S/cm or more.

Note that the amorphous sulfide inorganic solid electrolyte containing Li and P may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The inclusion of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The number-average particle diameter of the inorganic solid electrolyte is preferably 0.1 μm or more, and more preferably 0.3 μm or more, and is preferably 20 μm or less, more preferably 10 μm or less, even more preferably 7 μm or less, and further preferably 5 μm or less. When the number-average particle diameter is not less than any of the lower limits set forth above, handling is facilitated, and adhesiveness of an electrode mixed material layer formed using the slurry composition can be sufficiently increased. On the other hand, when the number-average particle diameter is not more than any of the upper limits set forth above, sufficient surface area of the inorganic solid electrolyte can be ensured, and output characteristics of an all-solid-state secondary battery can be sufficiently improved.

The "number-average particle diameter" of an inorganic solid electrolyte or electrode active material referred to in the present specification can be determined by observing 100 particles of the inorganic solid electrolyte or electrode active material using an electron microscope, measuring the particle diameters of these particles in accordance with JIS Z8827-1:2008, and calculating an average value of the measured particle diameters.

<<Polymeric Inorganic Solid Electrolyte>>

The polymeric inorganic solid electrolyte may be a polymeric inorganic solid electrolyte obtained through inclusion of an electrolyte salt in a polyethylene oxide derivative, a polymer including a polyethylene oxide derivative, a polypropylene oxide derivative, a polymer including a polypropylene oxide derivative, a phosphoric acid ester polymer, a polycarbonate derivative, a polymer including a polycarbonate derivative, or the like.

In a case in which the all-solid-state secondary battery is an all-solid-state lithium ion secondary battery, examples of electrolyte salts that can be used include, but are not specifically limited to, fluorine-containing lithium salts such as lithium hexafluorophosphate ($LiPF_6$), lithium tetrafluoroborate ($LiBF_4$), and lithium bis(trifluoromethanesulfonyl) imide (LiTFSI).

<Electrode Active Material>

The electrode active material is a material that gives and receives electrons in an electrode of an all-solid-state secondary battery. In a case in which the all-solid-state secondary battery is an all-solid-state lithium ion secondary battery, the electrode active material is normally a material that can occlude and release lithium.

Although the following describes a case in which the all-solid-state secondary battery is an all-solid-state lithium ion secondary battery, the present disclosure is not limited to this case.

A positive electrode active material formed of an inorganic compound or a positive electrode active material formed of an organic compound may be used as a positive electrode active material without any specific limitations. One positive electrode active material may be used, or two or more positive electrode active materials may be used in combination in a freely selected ratio. Moreover, a mixture of an inorganic compound and an organic compound may be used.

The positive electrode active material formed of an inorganic compound may be a transition metal oxide, a complex oxide of lithium and a transition metal (lithium-containing complex metal oxide), a transition metal sulfide, or the like. The aforementioned transition metal may be Fe, Co, Ni, Mn, or the like. Examples of inorganic compounds that can be used as the positive electrode active material include lithium-containing complex metal oxides such as a lithium-containing complex metal oxide of Co—Ni—Mn ($Li(Co Mn Ni)O_2$), a lithium-containing complex metal oxide of Ni—Co—Al, lithium-containing cobalt oxide ($LiCoO_2$), lithium-containing nickel oxide ($LiNiO_2$), lithium manganate ($LiMnO_2$, $LiMn_2O_4$), olivine-type lithium iron phosphate ($LiFePO_4$), and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

The positive electrode active material formed of an organic compound may be polyaniline, polypyrrole, a polyacene, a disulfide compound, a polysulfide compound, an N-fluoropyridinium salt, or the like.

An allotrope of carbon such as graphite or coke may be used as a negative electrode active material. A negative electrode active material formed of an allotrope of carbon can be in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The number-average particle diameter of the electrode active material is preferably 0.1 μm or more, and more preferably 1 μm or more, and is preferably 40 μm or less, and more preferably 30 μm or less. When the number-average particle diameter is not less than any of the lower limits set forth above, handling is facilitated, and adhesiveness of an obtained electrode mixed material layer can be sufficiently increased. On the other hand, when the number-average particle diameter is not more than any of the upper limits set forth above, sufficient surface area of the electrode active material can be ensured, and output characteristics of an all-solid-state secondary battery can be sufficiently improved.

<Other Components>

The presently disclosed slurry composition can contain components such as leveling agents, reinforcing materials, defoamers, antioxidants, surfactants, and dispersants other than the components described above. Commonly known components can be used as these components.

The presently disclosed slurry composition can contain a solvent that is optionally added in production of the slurry composition. This additional solvent is not specifically limited but is preferably an organic solvent such as described in relation to the conductive material paste. In a case in which an organic solvent is added, the organic solvent contained in the conductive material paste and the added organic solvent are preferably the same from a viewpoint of compatibility.

Moreover, the presently disclosed slurry composition can contain a binder component that is optionally added in production of the slurry composition. The additional binder component is not specifically limited but is preferably a (meth)acrylic polymer such as described in relation to the conductive material paste. In a case in which a (meth)acrylic polymer is added, the (meth)acrylic polymer contained in the conductive material paste and the (meth)acrylic polymer that is added are preferably the same from a viewpoint of compatibility.

<Make-Up and Viscosity of Slurry Composition>

The amount of the solid electrolyte contained in the presently disclosed slurry composition is preferably an amount such that the proportion constituted by the solid electrolyte in the total amount (100 mass %) of the electrode active material and the solid electrolyte is 10 mass % or more, and more preferably 20 mass % or more, and is preferably an amount such that the proportion constituted by the solid electrolyte in the total amount (100 mass %) of the electrode active material and the solid electrolyte is 70 mass % or less, and more preferably 60 mass % or less. When this proportion is not less than any of the lower limits set forth above, sufficient ion conductivity can be ensured, the electrode active material can be effectively utilized, and the capacity of an all-solid-state secondary battery can be sufficiently increased. Moreover, when this proportion is not more than any of the upper limits set forth above, a sufficient amount of the electrode active material can be ensured, and the capacity of an all-solid-state secondary battery can be sufficiently increased.

The amount of the conductive material paste contained in the presently disclosed slurry composition is preferably an amount such that the conductive material in the conductive material paste is 0.5 parts by mass or more, and more preferably 1.0 parts by mass or more per 100 parts by mass, in total, of the electrode active material and the solid electrolyte, and is preferably an amount such that the conductive material in the conductive material paste is 10 parts by mass or less, and more preferably 5 parts by mass or less per 100 parts by mass, in total, of the electrode active material and the solid electrolyte.

The amount of the conductive material among 100 parts by mass of solid content in the slurry composition can be set as 0.5 parts by mass or more, and preferably 1 part by mass or more, and can be set as 10 parts by mass or less, and preferably 5 parts by mass or less.

The viscosity of the presently disclosed slurry composition (Brookfield B-type viscometer, 60 rpm, 25° C.) can be set as 8,000 mPa·s or less. The viscosity is preferably 6,000 mPa·s or less, and more preferably 5,000 mPa·s or less. The viscosity is preferably 500 mPa·s or more, and more preferably 1,000 mPa·s or more from a viewpoint of stability over time.

<Production Method of Slurry Composition>

The production method of the presently disclosed slurry composition is not specifically limited and may be a method in which the conductive material paste, solid electrolyte, electrode active material, optional additional organic solvent, and optional other components described above are mixed.

(Electrode for All-Solid-State Secondary Battery)

The presently disclosed electrode for an all-solid-state secondary battery (hereinafter, also referred to as an "electrode") is an electrode that is formed using the presently disclosed slurry composition for an all-solid-state secondary battery electrode. For example, the slurry composition may be applied onto the surface of a current collector to form a coating film, and the coating film that is formed may subsequently be dried to thereby obtain an electrode that includes the current collector and an electrode mixed material layer on the current collector.

<Current Collector>

The current collector is not specifically limited so long as it is a material having electrical conductivity and electrochemical durability. A metal material such as iron, copper, aluminum, nickel, stainless steel, titanium, tantalum, gold, or platinum is preferable from a viewpoint of heat resistance, of which, aluminum is particularly preferable for a positive electrode, and copper is particularly preferable for a negative electrode. Although no specific limitations are placed on the shape of the current collector, a sheet shape of approximately 0.001 mm to 0.5 mm in thickness is preferable. The current collector is preferably subjected to surface roughening before use in order to increase adhesive strength with the electrode mixed material layer. The surface roughening method is not specifically limited and may be a mechanical polishing method, an electrolytic polishing method, a chemical polishing method, or the like. In the mechanical polishing method, a coated abrasive to which abrasive grains are bonded, a whetstone, an emery wheel, or a wire brush including steel wire or the like may be used. Moreover, an intermediate layer may be formed at the surface of the current collector in order to increase adhesive strength of the current collector and the electrode mixed material layer and/or electrical conductivity.

14

<Electrode Mixed Material Layer>

The electrode mixed material layer can be formed using the presently disclosed slurry composition, is composed of a dried product of the presently disclosed slurry composition, and contains at least a solid electrolyte, an electrode active material, a conductive material, and a (meth)acrylic polymer.

<Production Method of Electrode for All-Solid-State Secondary Battery>

The formation method of the electrode is not specifically limited and may be a method in which a step of applying the presently disclosed slurry composition onto a current collector (application step) and a step of drying the slurry composition that has been applied onto the current collector to form an electrode mixed material layer (drying step) are performed.

<<Application Step>>

The method by which the presently disclosed slurry composition is applied onto the current collector is not specifically limited and may be doctor blading, dip coating, reverse roll coating, direct roll coating, gravure coating, extrusion coating, brush coating, or the like.

The applied amount of the slurry composition can be set as appropriate depending on the desired electrode mixed material layer thickness, etc., without any specific limitations.

<<Drying Step>>

The method by which the slurry composition on the current collector is dried is not specifically limited and may be drying through warm, hot, or low-humidity air, vacuum drying, or drying through irradiation with (far) infrared light, electron beams, or the like. The drying conditions can be set as appropriate, and the drying temperature is preferably not lower than 50° C. and not higher than 250° C., and preferably not lower than 80° C. and not higher than 200° C. The drying time is not specifically limited but is normally within a range of not less than 10 minutes and not more than 60 minutes.

Note that the electrode may be stabilized by pressing the electrode after drying. The pressing method may be a method such as mold pressing or calender pressing, but is not limited thereto.

The mass per unit area of the electrode mixed material layer is not specifically limited but is preferably 1.0 mg/cm² or more, and more preferably 5.0 mg/cm² or more, and is preferably 30.0 mg/cm² or less, and more preferably 25.0 mg/cm² or less.

(All-Solid-State Secondary Battery)

The presently disclosed all-solid-state secondary battery includes the presently disclosed electrode. In other words, the presently disclosed all-solid-state secondary battery is a secondary battery in which either or both of a positive electrode and a negative electrode are formed using a slurry composition for an all-solid-state secondary battery electrode that contains the presently disclosed conductive material paste.

Examples of electrodes not corresponding to the presently disclosed electrode that can be used in the presently disclosed all-solid-state secondary battery include any electrode for an all-solid-state secondary battery without any specific limitations.

Moreover, examples of solid electrolyte layers that can be used in the presently disclosed all-solid-state secondary battery include any solid electrolyte layer without any specific limitations.

The presently disclosed all-solid-state secondary battery can be obtained by stacking the positive electrode and the negative electrode such that a positive electrode mixed material layer of the positive electrode and a negative electrode mixed material layer of the negative electrode are in opposition via the solid electrolyte layer, optionally performing pressing thereof to obtain a laminate, subsequently placing the laminate in a battery container in that form or after rolling, folding, or the like in accordance with the battery shape, and then sealing the battery container. An expanded metal, an overcurrent preventing device such as a fuse or a PTC device, a lead plate, or the like may be placed in the battery container as necessary in order to prevent pressure increase inside the battery and occurrence of overcharging or overdischarging. The battery shape may be a coin type, button type, sheet type, cylinder type, prismatic type, flat type, or the like without any specific limitations.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, measurements of the proportional contents of monomer units, the weight-average molecular weight, and the gel content of a polymer were performed as described below. Solubility parameters are values (units: $(cal/cm^3)^{1/2}$) calculated according to Hansen solubility parameters as previously described. Evaluations of dispersibility of a conductive material paste and battery characteristics (internal resistance and high-temperature cycle characteristics) of an all-solid-state secondary battery were also performed as described below.

<Proportional Contents of Monomer Units in Polymer>

After coagulating 100 g of a binder solution produced in Example 8 (described further below) in 1 L of methanol, 12 hours of vacuum drying was performed at a temperature of 60° C. The obtained dry polymer was analyzed by $^1$H-NMR. Based on the obtained analysis values, the proportional content (mass %) of each type of monomer unit included in a polymer in the binder solution was calculated. In other examples and comparative examples, the proportional content of each type of monomer unit was substantially the same as the proportional content (charged amount) of the monomer in a monomer composition.

<Weight-Average Molecular Weight of Polymer>

The weight-average molecular weight of a polymer produced in each example or comparative example was calculated based on polystyrene-equivalent molecular weight obtained using high-performance liquid chromatography (apparatus: HLC8220 (model no.) produced by Tosoh Corporation). In this high-performance liquid chromatography, three connected columns (Shodex KF-404HQ (model no.) produced by Showa Denko K.K.; column temperature: 40° C.; carrier: tetrahydrofuran at flow rate of 0.35 mL/min) were used and a differential refractometer and a UV detector were used as detectors. Calibration of molecular weight was performed using 12 points for standard polystyrene (produced by Polymer Laboratories; standard molecular weight: 500 to 3,000,000).

<Gel Content (Amount of THF-Insoluble Content)>

With respect to a water dispersion after polymerization of monomers in production of a binder solution in each example or comparative example (water dispersion of (meth)acrylic polymer concentrated after hydrogenation reaction in Example 8), the water dispersion was dried in an environment of 50% humidity and 23° C. to 25° C. to produce a film of 3±0.3 mm in thickness. The produced film was cut up into 5 mm squares to prepare a plurality of film pieces, and approximately 1 g of these film pieces were precisely weighed. The weight of the precisely weighed film pieces was taken to be $W_0$. Next, the precisely weighed film pieces were immersed in 100 g of tetrahydrofuran (THF) at 25° C. for 24 hours. The film pieces were subsequently pulled out of the THF, the pulled out film pieces were vacuum dried at 105° C. for 3 hours, and the weight $W_1$ of the film pieces (weight of insoluble content) was measured. The amount of THF-insoluble content (%) was calculated according to the following formula as the gel content (mass %).

$$Gel\ content\ (mass\ \%) = W_1/W_0 \times 100$$

<Dispersibility of Conductive Material Paste>

A conductive material paste produced in each example or comparative example was stirred three times using a planetary centrifugal mixer (THINKY MIXER ARE310) under conditions of 2,000 rpm and 1 minute, and was then measured using a Brookfield B-type viscometer (60 rpm, 25° C., spindle shape 64).

A: Viscosity of not less than 1,000 mPa·s and less than 3,000 mPa·s

B: Viscosity of not less than 3,000 mPa·s and less than 5,000 mPa·s

C: Viscosity of not less than 5,000 mPa·s and less than 8,000 mPa·s

D: Viscosity of 8,000 mPa·s or more, or not dispersed (no fluidity)

<Battery Characteristics (Internal Resistance: IV Resistance)>

An all-solid-state secondary battery produced in each example or comparative example was charged to an SOC (State Of Charge) of 50% at 1C (C is a value expressed by rated capacity (mA)/1 h (hour)). The all-solid-state secondary battery was then subjected to 30 seconds of charging and 30 seconds of discharging at each of 0.5C, 1.0C, 2.0C, and 5.0C, centered on an SOC of 50%. The battery voltage after 30 seconds for each of these cases (charging side and discharging side) was plotted against the current value, and the gradient of the plot was then determined as the IV resistance (Ω) (IV resistance during charging and IV resistance during discharging). The obtained IV resistance value (Ω) was evaluated by the following standard. A smaller IV resistance value indicates less internal resistance.

A: IV resistance of 80Ω or less

B: IV resistance of more than 80Ω and not more than 90Ω

C: IV resistance of more than 90Ω and not more than 100Ω

D: IV resistance of more than 100Ω

<Battery Characteristics (High-Temperature Cycle Characteristics)>

An all-solid-state secondary battery produced in each example or comparative example was subjected to 100 cycles of charging and discharging at 60° C. in which the all-solid-state secondary battery was charged from 3 V to 4.3 V at 0.1C and was then discharged from 4.3 V to 3 V at 0.1C. A capacity maintenance rate expressed by a ratio (d/c (%)) of the 0.1C discharge capacity d of the 100th cycle relative to the 0.1C discharge capacity c of the 5th cycle was determined and was evaluated by the following standard as an evaluation criterion for high-temperature cycle characteristics. A larger value indicates less reduction of discharge capacity and better high-temperature cycle characteristics.

A: Capacity maintenance rate of 60% or more

B: Capacity maintenance rate of not less than 50% and less than 60%

C: Capacity maintenance rate of not less than 40% and less than 50%

D: Capacity maintenance rate of not less than 30% and less than 40%

Example 1

<Production of (Meth)Acrylic Polymer and Binder Solution>

A 1 L septum-equipped flask including a stirrer was charged with 100 parts of deionized water and 0.2 parts of sodium dodecylbenzenesulfonate as an emulsifier, the gas phase was purged with nitrogen gas, heating was performed to 60° C., and then 0.25 parts of potassium persulfate (KPS) as a polymerization initiator was dissolved in 20.0 parts of deionized water and was added into the flask.

Meanwhile, a monomer composition was obtained in a separate vessel by mixing 40 parts of deionized water, 1.0 parts of sodium dodecylbenzenesulfonate as an emulsifier, 15 parts of styrene (St), 80 parts of n-butyl acrylate (BA), and 5 parts of acrylonitrile (AN). This monomer composition was continuously added into the 1 L septum-equipped flask over 3 hours to carry out polymerization. The reaction was carried out at 60° C. during the addition. Once the addition was complete, a further 3 hours of stirring was performed at 80° C. to complete the reaction.

A suitable amount of an organic solvent (butyl butyrate) was added to the resultant water dispersion of a polymer to obtain a mixture. The mixture was subsequently subjected to vacuum distillation at 90° C. to remove water and excess butyl butyrate from the mixture and thereby yield a binder solution (solid content concentration: 8%).

<Production of Conductive Material Paste>

A composition having a solid content concentration of 10% was produced by mixing the binder solution described above (amount equivalent to 1 part of solid content) and 3 parts of acetylene black (DENKA BLACK powder; Denka Company Limited; specific surface area: 68 m²/g; average particle diameter: 35 nm), and then adding butyl butyrate to the resultant mixture. This composition was mixed by a planetary kneader to obtain a conductive material paste. The obtained conductive material paste was used to evaluate dispersibility.

<Production of Slurry Composition for Negative Electrode Mixed Material Layer>

A composition having a solid content concentration of 60% was produced by mixing 65 parts of graphite (number-average particle diameter: 20 μm) as a negative electrode active material, 30 parts of sulfide glass composed of Li$_2$S and P$_2$S$_5$ (Li$_2$S/P$_2$S$_5$=70 mol %/30 mol %; number-average particle diameter: 0.9 μm) as an inorganic solid electrolyte, the conductive material paste described above (amount equivalent to 3 parts of acetylene black), and the binder solution described above (amount equivalent to 1 part of solid content), and then adding butyl butyrate to the resultant mixture. This composition was mixed by a planetary kneader to obtain a slurry composition for a negative electrode mixed material layer.

<Production of Slurry Composition for Positive Electrode Mixed Material Layer>

A composition having a solid content concentration of 75% was produced by mixing 100 parts of an active material NMC532 based on a lithium complex oxide of Co—Ni—Mn (LiNi$_{5/10}$Co$_{2/10}$Mn$_{3/10}$O$_2$; number-average particle diameter: 10.0 μm) as a positive electrode active material, 50 parts of sulfide glass composed of Li$_2$S and P$_2$S$_5$ (Li$_2$S/P$_2$S$_5$=70 mol %/30 mol %; number-average particle diameter: 0.4 μm) as a solid electrolyte, 3 parts of acetylene black as a conductive material, and the binder solution described above (amount equivalent to 2 parts of solid content), and then adding butyl butyrate to the resultant mixture. This composition was mixed by a planetary centrifugal mixer and was then further adjusted to a solid content concentration of 70% with butyl butyrate to obtain a slurry composition for a positive electrode mixed material layer.

<Production of Slurry Composition for Solid Electrolyte Layer>

A composition having a solid content concentration of 60% was produced by mixing 98 parts of sulfide glass composed of Li$_2$S and P$_2$S$_5$ (Li$_2$S/P$_2$S$_5$=70 mol %/30 mol %; number-average particle diameter: 0.9 μm) as a solid electrolyte and the binder solution described above (amount equivalent to 2 parts of solid content), and then adding butyl butyrate to the resultant mixture. This composition was mixed using a planetary kneader to obtain a slurry composition for a solid electrolyte layer.

<Production of Negative Electrode>

The slurry composition for a negative electrode mixed material layer was applied onto the surface of copper foil serving as a current collector and was dried at 120° C. for 30 minutes to obtain a negative electrode including a negative electrode mixed material layer (mass per unit area: 10.0 mg/cm²) at one side of the copper foil serving as a current collector.

<Production of Positive Electrode>

The slurry composition for a positive electrode mixed material layer was applied onto the surface of aluminum foil serving as a current collector and was dried at 120° C. for 30 minutes to obtain a positive electrode including a positive electrode mixed material layer (mass per unit area: 18.0 mg/cm²) at one side of the aluminum foil serving as a current collector.

<Production of Solid Electrolyte Layer>

The slurry composition for a solid electrolyte layer was dried on a releasable sheet serving as a substrate, and then a dried product thereof was peeled from the releasable sheet and was ground in a mortar to obtain a powder. A pellet (solid electrolyte layer) of 500 μm in thickness was obtained by loading 0.05 mg of the obtained powder into a 010 mm mold and performing molding thereof at a pressure of 200 MPa.

<Production of All-Solid-State Secondary Battery>

The negative electrode and the positive electrode obtained as described above were each punched out as Ø10 mm. The solid electrolyte layer obtained as described above was sandwiched between the punched out positive electrode and negative electrode (with the electrode mixed material layers of these electrodes in contact with the solid electrolyte layer), and pressing thereof was performed with a pressure of 200 MPa to obtain a laminate for an all-solid-state secondary battery. The obtained laminate was arranged inside an evaluation cell (restraining pressure: 40 MPa) to obtain an all-solid-state secondary battery. Cell characteristics of the obtained all-solid-state secondary battery were evaluated. The results are shown in Table 1.

In Examples 1 to 7, 9, and 10 and in Comparative Examples 2 to 5, a conductive material paste, a slurry composition for a negative electrode mixed material layer, a slurry composition for a positive electrode mixed material layer, a slurry composition for a solid electrolyte layer, a negative electrode, a positive electrode, and an all-solidstate secondary battery were produced in the same way as in Example 1. However, the types and amounts of monomers in the monomer composition and the type of solvent were changed to the types and amounts indicated in Table 1. The solvent used in the slurry composition for a negative electrode mixed material layer, the slurry composition for a positive electrode mixed material layer, and the slurry composition for a solid electrolyte layer was set as the same solvent as used in the conductive material paste of each example or comparative example (i.e., the same as the organic solvent used in production of the binder solution in each example or comparative example and as indicated in Table 1). Dispersibility and cell characteristics of a battery were evaluated for the obtained conductive material paste and all-solid-state secondary battery. The results are shown in Table 1.

Example 8

A conductive material paste, a slurry composition for a negative electrode mixed material layer, a slurry composition for a positive electrode mixed material layer, a slurry composition for a solid electrolyte layer, a solid electrolyte layer, a negative electrode, a positive electrode, and an all-solid-state secondary battery were produced in the same way as in Example 1 with the exception that a (meth)acrylic polymer was produced and a binder solution was obtained as described below. Dispersibility and cell characteristics of a battery were evaluated for the obtained conductive material paste and all-solid-state secondary battery. The measurement method of the proportional contents of monomer units in the (meth)acrylic polymer was as previously described.

A reactor was charged with 2 parts of potassium oleate as an emulsifier, 0.1 parts of potassium phosphate as a stabilizer, and 150 parts of water. In addition, 19 parts of acrylonitrile, 48 parts of 1,3-butadiene, 33 parts of butyl acrylate (BA), and 0.31 parts of t-dodecyl mercaptan as a molecular weight modifier were added into the reactor, and emulsion polymerization was initiated at 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomers to end the polymerization.

Once the polymerization had ended, heating was performed and then water vapor distillation was performed at 70° C. under reduced pressure in order to collect unreacted monomer. Thereafter, 2 parts of an alkylated phenol was added as an antioxidant to obtain a water dispersion of a polymer.

After loading 400 mL of the obtained water dispersion of the polymer (total solid content: 48 g) into a 1 L autoclave that was equipped with a stirrer, nitrogen gas was passed for 10 minutes in order to remove dissolved oxygen in the water dispersion. Thereafter, 50 mg of palladium acetate was dissolved in 180 mL of water to which nitric acid had been added in an amount of 4 molar equivalents relative to the Pd and was then added into the autoclave as a hydrogenation reaction catalyst. After purging the system twice with hydrogen gas, the contents of the autoclave were heated to 50° C. in a state in which the pressure was raised to 3 MPa with hydrogen gas, and a hydrogenation reaction was carried out for 6 hours.

Next, the contents of the autoclave were restored to normal temperature and the system was converted to a nitrogen atmosphere. Thereafter, concentrating was performed using an evaporator until a solid content concentration of 40% was reached to thereby yield a water dispersion of a (meth)acrylic polymer.

A suitable amount of butyl butyrate was then added to the obtained water dispersion of the (meth)acrylic polymer to obtain a mixture. The mixture was subsequently subjected to vacuum distillation at 90° C. to remove water and excess butyl butyrate from the mixture and thereby yield a binder solution (solid content concentration: 8%).

Comparative Example 1

A slurry composition for a positive electrode mixed material layer, a slurry composition for a solid electrolyte layer, a solid electrolyte layer, a negative electrode, a positive electrode, and an all-solid-state secondary battery were produced, and cell characteristics of the battery were evaluated in the same way as in Example 1 with the exception that a slurry composition for a negative electrode mixed material layer was produced as described below, not via a conductive material paste. The results are shown in Table 1.
<Production of Slurry Composition for Negative Electrode Mixed Material Layer>

A composition having a solid content concentration of 65% was produced by mixing 100 parts of graphite (number-average particle diameter: 20 μm) as a negative electrode active material, 50 parts of sulfide glass composed of $Li_2S$ and $P_2S_5$ ($Li_2S/P_2S_5$=70 mol %/30 mol %; number-average particle diameter: 0.4 μm) as a solid electrolyte, and the binder solution produced in Example 1 (amount equivalent to 3 parts of solid content), and then adding butyl butyrate to the resultant mixture. This composition was mixed by a planetary centrifugal mixer and was then further adjusted to a solid content concentration of 60% with butyl butyrate to obtain a slurry composition for a negative electrode mixed material layer.

Example 11

A slurry composition for a negative electrode mixed material layer and a slurry composition for a positive electrode mixed material layer were produced as described below. The slurry composition for a positive electrode mixed material layer includes the presently disclosed conductive material paste. With the exception of the above, a slurry composition for a solid electrolyte layer, a solid electrolyte layer, a positive electrode, a negative electrode, and an all-solid-state secondary battery were produced, and cell characteristics of the battery were evaluated in the same way as in Example 1. The results are shown in Table 1.
<Production of Slurry Composition for Negative Electrode Mixed Material Layer>

A composition having a solid content concentration of 65% was produced by mixing 100 parts of graphite (number-average particle diameter: 20 μm) as a negative electrode active material, 50 parts of sulfide glass composed of $Li_2S$ and $P_2S_5$ ($Li_2S/P_2S_5$=70 mol %/30 mol %; number-average particle diameter: 0.4 μm) as a solid electrolyte, and the binder solution produced in Example 1 (amount equivalent to 3 parts of solid content), and then adding butyl butyrate to the resultant mixture. This composition was mixed by a planetary centrifugal mixer and was then further adjusted to a solid content concentration of 60% with butyl butyrate to obtain a slurry composition for a negative electrode mixed material layer.

<Production of Slurry Composition for Positive Electrode Mixed Material Layer>

A composition having a solid content concentration of 75% was produced by mixing 65 parts of an active material NMC532 based on a lithium complex oxide of Co—Ni—Mn (LiNi$_{5/10}$Co$_{2/10}$Mn$_{3/10}$O$_2$; number-average particle diameter: 10.0 μm) as a positive electrode active material, 30 parts of sulfide glass composed of Li$_2$S and P$_2$S$_5$ (Li$_2$S/P$_2$S$_5$=70 mol %/30 mol %; number-average particle diameter: 0.9 μm) as an inorganic solid electrolyte, the conductive material paste produced in Example 1 (amount equivalent to 3 parts of acetylene black), and the binder solution produced in Example 1 (amount equivalent to 1 part of solid content), and then adding butyl butyrate to the resultant mixture. This composition was mixed by a planetary kneader for 60 minutes, and was then adjusted to a solid content concentration of 70% with butyl butyrate and mixed for a further 10 minutes by the planetary kneader to obtain a slurry composition for a positive electrode mixed material layer.

TABLE 1

| | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 | Comparative Example 5 |
|---|---|---|---|---|---|---|---|---|---|---|---|---|---|---|---|---|---|
| Monomer composition *1 (parts by mass) | Butyl acrylate (BA) | 80 | 80 | 90 | 80 | 80 | 50 | 62 | 40 | 95 | 70 | 80 | 80 | 98 | 10 | 80 | 80 |
| | Ethyl acrylate (EA) | — | — | — | — | — | 30 | — | — | — | — | — | — | — | — | — | — |
| | Acrylonitrile (AN) | 5 | 5 | 5 | 5 | 5 | 5 | 28 | 20 | 5 | 30 | 5 | 5 | 2 | 20 | 5 | 5 |
| | Styrene (St) | 15 | 15 | 5 | 15 | 15 | 15 | 10 | — | — | — | 15 | 15 | 0 | 70 | 15 | 15 |
| | Hydrogenated butadiene | — | — | — | — | — | — | — | 40 | — | — | — | — | — | — | — | — |
| Polymer | Gel content | 0% | 2% | 0% | 0% | 0% | 0% | 4% | 3% | 0% | 0% | 0% | 0% | 0% | 3% | 0% | 0% |
| Organic solvent | Type | Butyl butyrate | Xylene | Butyl butyrate | Hexane | Decane | Butyl butyrate | Butyl butyrate | Butyl butyrate | Butyl butyrate | Butyl butyrate | Butyl butyrate | — | Butyl butyrate | Butyl butyrate | N-methyl pyrrolidone | Poly-tetrafluoro ethylene |
| | SP value | 8.1 | 8.5 | 8.1 | 7.4 | 6.5 | 8.1 | 8.1 | 8.1 | 8.1 | 8.1 | 8.1 | — | 8.1 | 8.1 | 10.6 | 6.2 |
| Location of use of conductive material paste | | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer | Positive electrode mixed material layer | — | Negative electrode mixed material layer | Negative electrode mixed material layer | Negative electrode mixed material layer | Negative electrode mixed material layer |
| Characteristics | Dispersibility of conductive paste | A | A | B | B | B | A | B | A | B | B | A | — | C | D | A | D |
| | Internal resistance | A | A | B | B | B | A | B | A | B | B | A | D | C | D | D | D |
| | High-temperature cycle characteristics | A | A | A | B | B | A | B | A | B | B | A | D | C | C | D | D |

*1 In Examples 1 to 7 and 9 to 11 and in Comparative Examples 1 to 5, contents (charged amounts) of monomers in the monomer composition are equal to contents of monomer units in the polymer.
In Example 8, contents of monomer units in the polymer are as shown.

In Examples 1 to 11 in which the presently disclosed conductive material paste was used, an all-solid-state secondary battery having sufficiently reduced internal resistance and excellent high-temperature cycle characteristics was obtained. Good dispersibility of the conductive material in each of the conductive material pastes was also confirmed.

In Comparative Example 1 in which a slurry composition was not produced via a conductive material paste, internal resistance of the obtained all-solid-state secondary battery was not sufficiently reduced, and high-temperature cycle characteristics were poor.

Moreover, although a conductive material paste was used in each of Comparative Examples 2 to 5, the binder component or organic solvent deviated from the scope of the present disclosure, internal resistance of the obtained all-solid-state secondary battery was not sufficiently reduced, and high-temperature cycle characteristics were poor.

The invention claimed is:

1. A conductive material paste for an all-solid-state secondary battery electrode comprising: a conductive carbon material; a polymer including a butyl acrylate monomer unit in a proportion of not less than 25 mass % and not more than 85 mass %; and an organic solvent having a solubility parameter (SP value) of not less than 8.0 $(cal/cm^3)^{1/2}$ and not more than 10.0 $(cal/cm^3)^{1/2}$, wherein an amount of the conductive carbon material among 100 parts by mass of solid content in the conductive material paste is more than 10 parts by mass, and 95 parts by mass or less, a solid content concentration of the conductive material paste is 5 mass % or more, and 20 mass % or less, and the polymer further includes an α,β-unsaturated nitrile monomer unit constituting a proportion of not less than 4 mass % and not more than 20 mass % in the polymer.

2. The conductive material paste for an all-solid-state secondary battery electrode according to claim 1, wherein the polymer further includes a hydrophobic monomer unit.

3. The conductive material paste for an all-solid-state secondary battery electrode according to claim 2, wherein the hydrophobic monomer unit constitutes a proportion of not less than 3 mass % and not more than 60 mass % in the polymer.

4. A slurry composition for an all-solid-state secondary battery electrode comprising: the conductive material paste for an all-solid-state secondary battery electrode according to claim 1; a solid electrolyte; and an electrode active material, wherein the amount of the conductive carbon material is 1.0 parts by mass or more, and 5 parts by mass or less per 100 parts by mass, in total, of the electrode active material and the solid electrolyte.

5. An electrode for an all-solid-state secondary battery comprising an electrode mixed material layer formed using the slurry composition for an all-solid-state secondary battery electrode according to claim 4.

6. An all-solid-state secondary battery comprising the electrode for an all-solid-state secondary battery according to claim 5.

7. The conductive material paste for an all-solid-state secondary battery electrode according to claim 1, wherein the polymer has a gel content of 50 mass % or less.

8. The conductive material paste for an all-solid-state secondary battery electrode according to claim 1, wherein the organic solvent is butyl butyrate.

* * * * *